US010161315B2

(12) United States Patent
Kitagawa et al.

(10) Patent No.: US 10,161,315 B2
(45) Date of Patent: Dec. 25, 2018

(54) EQUIPMENT MAINTENANCE COMPONENT REPLACEMENT PRIORITIZATION PLANNING SYSTEM AND METHOD

(71) Applicant: MITSUBISHI HITACHI POWER SYSTEMS, LTD., Kanagawa (JP)

(72) Inventors: Tomoaki Kitagawa, Tokyo (JP); Manabu Kasano, Tokyo (JP); Aki Nakayama, Tokyo (JP); Akihiko Yamada, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 76 days.

(21) Appl. No.: 15/301,145

(22) PCT Filed: Mar. 27, 2015

(86) PCT No.: PCT/JP2015/059753
§ 371 (c)(1),
(2) Date: Sep. 30, 2016

(87) PCT Pub. No.: WO2015/152086
PCT Pub. Date: Oct. 8, 2015

(65) Prior Publication Data
US 2017/0016400 A1    Jan. 19, 2017

(30) Foreign Application Priority Data
Apr. 4, 2014   (JP) .................... 2014-078102

(51) Int. Cl.
*G06Q 50/10* (2012.01)
*F02C 9/00* (2006.01)
(Continued)

(52) U.S. Cl.
CPC ............ *F02C 9/00* (2013.01); *F01D 5/005* (2013.01); *G05B 15/02* (2013.01); *G06Q 50/10* (2013.01);
(Continued)

(58) Field of Classification Search
CPC combination set(s) only.
See application file for complete search history.

(56) References Cited

U.S. PATENT DOCUMENTS 4,410,950 A * 10/1983 Toyoda ............... F01K 13/02
701/99
5,216,612 A * 6/1993 Cornett ............. G05B 19/4184
700/96
(Continued)

FOREIGN PATENT DOCUMENTS

EP    1 217 189    6/2002
JP    10-176546    6/1998
(Continued)

OTHER PUBLICATIONS

Labib, Ashraf W., A decision analysis model for maintenance policy selection using a CMMS Journal of Quality in Maintenance Engineering, vol. 10, No. 3, 2004.*
(Continued)

*Primary Examiner* — Scott L Jarrett
(74) *Attorney, Agent, or Firm* — Wenderoth, Lind & Ponack, L.L.P.

(57) ABSTRACT

An operation plan preparation and evaluation device including a storage unit for storing master data related to equipment and a component, transaction data related to the equipment and the component generated when an operation plan is prepared, and an initial parameter used when the operation plan is prepared, and a control unit for preparing the operation plan based on the master data, the transaction
(Continued)

data, and the initial parameter, in which the control unit performs a factor setting process of assigning a predetermined set value as the initial parameter, an operation plan preparation process of preparing the operation plan based on the initial parameter serving as the set value, the master data, and the transaction data, and an operation plan evaluation process of evaluating a plurality of respective operation plans prepared by repeatedly performing the operation plan preparation process while varying the initial parameter, and deriving an optimum operation plan.

15 Claims, 15 Drawing Sheets

(51) Int. Cl.
  *F01D 5/00* (2006.01)
  *G05B 15/02* (2006.01)

(52) U.S. Cl.
  CPC ...... *F05D 2220/32* (2013.01); *F05D 2260/80* (2013.01); *F05D 2260/82* (2013.01); *F05D 2270/112* (2013.01)

(56) References Cited

U.S. PATENT DOCUMENTS

| | | | | |
|---|---|---|---|---|
| 5,623,109 A * | 4/1997 | Uchida | G05B 23/0254 | 376/215 |
| 5,623,404 A * | 4/1997 | Collins | G06Q 10/06 | 705/7.17 |
| 5,817,958 A * | 10/1998 | Uchida | G21C 7/36 | 73/865.9 |
| 5,920,846 A * | 7/1999 | Storch | G06Q 10/06311 | 379/15.03 |
| 6,067,486 A * | 5/2000 | Aragones | G06Q 10/06 | 340/500 |
| 6,104,988 A * | 8/2000 | Klarer | G01M 17/007 | 701/31.4 |
| 6,343,251 B1 * | 1/2002 | Herron | F02C 9/00 | 701/100 |
| 6,738,748 B2 * | 5/2004 | Wetzer | G06Q 10/06 | 705/7.14 |
| 6,820,038 B1 * | 11/2004 | Wetzer | G06Q 10/08 | 702/184 |
| 7,124,059 B2 * | 10/2006 | Wetzer | G05B 23/0283 | 702/184 |
| 7,457,786 B2 * | 11/2008 | Aragones | G06N 3/126 | 706/13 |
| 7,672,921 B1 * | 3/2010 | Clay | G06Q 10/06 | 706/12 |
| 7,783,507 B2 * | 8/2010 | Schick | B61L 27/0094 | 705/7.11 |
| 8,340,948 B1 * | 12/2012 | Song | G06Q 10/20 | 703/6 |
| 8,473,956 B2 * | 6/2013 | Kindel | G06F 9/4843 | 718/102 |
| 8,504,396 B2 * | 8/2013 | Quintus | G06Q 10/06 | 700/99 |
| 8,560,368 B1 * | 10/2013 | Maity | G06Q 10/20 | 705/7.13 |
| 2003/0187530 A1 * | 10/2003 | Hotta | F01D 5/005 | 700/97 |
| 2004/0117140 A1 * | 6/2004 | Borg | G03G 15/55 | 702/85 |
| 2006/0178762 A1 * | 8/2006 | Wroblewski | G05B 13/027 | 700/30 |
| 2008/0082345 A1 * | 4/2008 | Greiner | G06Q 10/06 | 705/305 |
| 2008/0234979 A1 * | 9/2008 | Costiner | G06Q 10/04 | 702/184 |
| 2008/0243310 A1 * | 10/2008 | Esposito | G05B 13/042 | 700/268 |
| 2009/0187449 A1 * | 7/2009 | van Tulder | G06Q 10/06 | 705/7.17 |
| 2010/0312371 A1 * | 12/2010 | Suginishi | G05B 19/41865 | 700/101 |
| 2011/0054965 A1 | 3/2011 | Katagiri et al. | | |
| 2011/0301992 A1 * | 12/2011 | Staaf | G06Q 10/06311 | 705/7.13 |
| 2012/0072194 A1 * | 3/2012 | Arnold | F02C 7/057 | 703/7 |
| 2012/0283963 A1 * | 11/2012 | Mitchell | F01D 17/02 | 702/34 |
| 2012/0290104 A1 * | 11/2012 | Holt | G06Q 10/00 | 700/29 |
| 2013/0262190 A1 * | 10/2013 | Sato | G05B 23/0283 | 705/7.36 |
| 2015/0378338 A1 * | 12/2015 | Kawamura | G06Q 50/10 | 700/14 |

FOREIGN PATENT DOCUMENTS

| | | |
|---|---|---|
| JP | 10-196403 | 7/1998 |
| JP | 2002-195056 | 7/2002 |
| JP | 2004-5461 | 1/2004 |
| JP | 2011-48688 | 3/2011 |
| WO | 01/23725 | 4/2001 |

OTHER PUBLICATIONS

Anderson, T.M. et al., Decision Support in Short Term and Long Term Maintenance Planning Using Condition Monitoring Information, Power Station Maintenance: Profitability Through Realiability, Mar. 30-Apr. 1, 1998, IEEE.*

Gage, Michael W., Equipment Maintenance and Replacement Decision Making Process California Polytechnic State University, Mar. 2013.*

Kobbacy, Kah et al., The development of a hybrid intelligent maintenance optimisation system (HIMOS) Journal of Operational Research Society, vol. 52, 2001.*

Nordgard, D.E. et al., Handling maintenance priorities using multi criteria decision making Power Tech Conference Proceedings, 2003.*

Yang, Zimin et al., Maintenance Priority Assignment Utilizing On-line Production Information Journal of Manufacturing Science and Engineering, vol. 129, ASME, Apr. 2007.*

International Search Report dated Jun. 16, 2015 in International (PCT) Application No. PCT/JP2015/059753.

"'Combined Cycle Hatsuden' (revised version) Dai VIII Sho Operation and Maintenance for Combined Cycle Plants", The Thermal and nuclear power, Dec. 15, 2010, vol. 61, No. 12, pp. 55 to 72 (cited in International Search Report).

Written Opinion dated Jun. 16, 2015 in corresponding International Application No. PCT/JP2015/059753.

* cited by examiner

COMPONENT MASTER DATA                                                    D1

| COMPONENT NUMBER | COMPONENT TYPE | COMPONENT DIVISION | DESIGN LIFE [EOH] | MANUFAC-TURING COST [YEN] |
|---|---|---|---|---|
| COMPONENT #1 | COMPONENT TYPE #1 | DIVISION #1 | ... | ... |
| COMPONENT #2 | COMPONENT TYPE #1 | DIVISION #2 | ... | ... |
| ... | ... | ... | ... | ... |
| ... | ... | ... | ... | ... |
|  |  |  |  |  |

FIG.3

OPERATION MASTER DATA D2

| OPERATION JOB ID | EQUIPMENT | START TIME | END TIME | TEST TYPE AFTER OPERATION |
|---|---|---|---|---|
| OPERATION #1 | EQUIPMENT #1 | 2013/10 | 2015/4 | TEST #1 |
| OPERATION #2 | EQUIPMENT #1 | 2015/4 | 2016/10 | TEST #2 |
| ... | ... | ... | ... | ... |
| OPERATION #n | EQUIPMENT #2 | 2014/4 | 2015/10 | TEST #1 |
| ... | ... | ... | ... | ... |

FIG.4

OPERATION CONDITION MASTER DATA D3

| OPERATION JOB ID | EQUIPMENT | REQUIRED COMPONENT TYPE | REQUIRED COMPONENT DIVISION | REQUIRED QUANTITY [NUMBER] | CONSUMPTION LIFE [EOH] |
|---|---|---|---|---|---|
| OPERATION #1 | EQUIPMENT #1 | COMPONENT TYPE #1 | DIVISION #1 | 98 | 12000 |
| OPERATION #1 | EQUIPMENT #1 | COMPONENT TYPE #1 | DIVISION #2 | 2 | 12000 |
| OPERATION #2 | EQUIPMENT #1 | COMPONENT TYPE #2 | DIVISION #1 | 50 | 12000 |
| OPERATION #2 | EQUIPMENT #1 | ... | ... | ... | ... |
| ... | ... | ... | ... | ... | ... |

FIG.5

TEST MASTER DATA  D4

| TEST TYPE ID | TEST PERIOD [DAYS] |
|---|---|
| TEST #1 | |
| TEST #2 | |
| ... | ... |

FIG.6

COMPONENT DAMAGE LEVEL MASTER DATA  D5

| EQUIPMENT | COMPONENT TYPE | OPERATION TIME [EOH] | COMPONENT DAMAGE LEVEL | PROPORTION [%] |
|---|---|---|---|---|
| EQUIPMENT #1 | COMPONENT #1 | 0 TO 12000 | No Damage | 80 |
| | | | Light | 80 |
| | | | Medium | 15 |
| | | | Heavy | 5 |
| | | | ... | 0 |
| | | | Scrap (DISCARD) | 0 |
| | | 12001 TO 24000 | ... | ... |
| | | ... | ... | ... |
| | COMPONENT #2 | ... | ... | ... |
| | ... | ... | ... | ... |
| EQUIPMENT #2 | ... | ... | ... | ... |
| ... | ... | ... | ... | ... |

FIG.7

REPAIR MASTER DATA  D6

| EQUIPMENT | COMPONENT TYPE | DAMAGE LEVEL | REPAIR PERIOD [DAYS] | REPAIR COST [YEN] |
|---|---|---|---|---|
| EQUIPMENT #1 | COMPONENT #1 | No Damage | 0 | ... |
| | | Light | 60 | ... |
| | | Medium | 90 | ... |
| | | Heavy | 120 | ... |
| | | ... | ... | ... |
| | COMPONENT #2 | ... | ... | ... |
| | ... | ... | ... | ... |
| EQUIPMENT #2 | ... | ... | ... | ... |
| ... | ... | ... | ... | ... |

FIG.8

EVENT QUEUE DATA  D7

| EVENT ID | EVENT TYPE | JOB ID | OCCURRENCE DATE |
|---|---|---|---|
| #1 | OPERATION START | OPERATION #1 | 2013/10 |
| #2 | OPERATION START | OPERATION #2 | 2014/4 |
| #3 | OPERATION END | OPERATION #1 | 2015/4 |
| ... | ... | ... | ... |
| #m | TEST END | TEST #x | ... |
| ... | ... | ... | ... |
| #n | REPAIR END | REPAIR #x | ... |
| ... | ... | ... | ... |

FIG.9

INDIVIDUAL ARTICLE LIST DATA  $_{\subset}$D8

| INDIVIDUAL ARTICLE ID | COMPONENT TYPE | COMPONENT DIVISION | OPERATION TIME [EOH] | ALLOCATED JOB ID |
|---|---|---|---|---|
| INDIVIDUAL ARTICLE #1 | COMPONENT #1 | DIVISION #1 | 8000 | OPERATION #1 |
| INDIVIDUAL ARTICLE #2 | COMPONENT #1 | DIVISION #1 | 12000 | OPERATION #2 |
| INDIVIDUAL ARTICLE #3 | COMPONENT #1 | DIVISION #2 | 8000 | REPAIR #1 |
| ... | ... | ... | ... | ... |
| ... | ... | ... | ... | ... |

FIG.10

NEW INPUT ARTICLE LIST DATA  $_{\subset}$D9

| INDIVIDUAL ARTICLE ID | COMPONENT TYPE | COMPONENT DIVISION | COMPONENT NUMBER | OPERATION TIME [EOH] | INPUT DATE |
|---|---|---|---|---|---|
| INDIVIDUAL ARTICLE #n | COMPONENT #1 | DIVISION #1 | ... | 0 | ... |
| INDIVIDUAL ARTICLE #n+1 | COMPONENT #1 | DIVISION #1 | ... | 0 | ... |
| INDIVIDUAL ARTICLE #n+2 | COMPONENT #1 | DIVISION #2 | ... | 0 | ... |
| ... | ... | ... | ... | ... | ... |
| ... | ... | ... | ... | ... | ... |

FIG.11

DISCARDED ARTICLE LIST DATA　　　D10

| INDIVIDUAL ARTICLE ID | COMPONENT TYPE | COMPONENT DIVISION | COMPONENT NUMBER | OPERATION TIME [EOH] | DISCARD DATE |
|---|---|---|---|---|---|
| INDIVIDUAL ARTICLE #n | COMPONENT #1 | DIVISION #1 | ... | 12000 | ... |
| INDIVIDUAL ARTICLE #n+1 | COMPONENT #1 | DIVISION #1 | ... | 12000 | ... |
| INDIVIDUAL ARTICLE #n+2 | COMPONENT #1 | DIVISION #2 | ... | 12000 | ... |
| ... | ... | ... | ... | ... | ... |
| ... | ... | ... | ... | ... | ... |

FIG.12

JOB EXECUTION RESULT DATA　　D11

| JOB ID | JOB TYPE | START DATE | END DATE |
|---|---|---|---|
| OPERATION #1 | OPERATION | 2013/10 | 2015/4 |
| OPERATION #2 | OPERATION | 2015/4 | 2016/10 |
| TEST #1 | TEST | ... | ... |
| REPAIR #1 | REPAIR | ... | ... |
| ... | ... | ... | ... |

FIG.13

COMPONENT ALLOCATION RESULT DATA  D12

| INDIVIDUAL ARTICLE ID | COMPONENT TYPE | COMPONENT DIVISION | ALLOCATED JOB ID |
|---|---|---|---|
| INDIVIDUAL ARTICLE #1 | COMPONENT #1 | DIVISION #1 | OPERATION #1 |
| INDIVIDUAL ARTICLE #2 | COMPONENT #1 | DIVISION #1 | OPERATION #2 |
| INDIVIDUAL ARTICLE #3 | COMPONENT #1 | DIVISION #2 | REPAIR #1 |
| ... | ... | ... | ... |
| ... | ... | ... | ... |

EQUIPMENT MAINTENANCE COMPONENT REPLACEMENT PRIORITIZATION PLANNING SYSTEM AND METHOD

FIELD

The present invention relates to an operation plan preparation and evaluation device and an operation plan preparation and evaluation method for a component.

BACKGROUND

In a rotation plan (operation plan) for a high-temperature component of a gas turbine, there has been a known system and method for minimizing a residual life at the time of discarding the high-temperature component (for example, see Patent Literature 1). In the system and method, a residual life of a high-temperature component is obtained, and the obtained residual life is compared with a subsequently scheduled operation time of a gas turbine, thereby preparing a rotation plan for the high-temperature component.

CITATION LIST

Patent Literature

Patent Literature 1: Japanese Patent Application Laid-open No. 2002-195056

SUMMARY

Technical Problem

However, in the system and method described in Patent Literature 1, since an operation plan for a component is prepared based on a residual life of a high-temperature component, the prepared operation plan for the component is uniquely determined despite a possibility that another optimum operation plan for the component may exist.

In this regard, an object of the invention is to provide an operation plan preparation and evaluation device and an operation plan preparation and evaluation method capable of preparing an optimum operation plan for a component.

Solution to Problem

According to an aspect of the present invention, an operation plan preparation and evaluation device for preparing an operation plan for a component used in equipment and evaluating the prepared operation plan, comprises: a storage unit for storing master information related to the equipment and the component, generated information related to the equipment and the component generated when the operation plan is prepared, and an initial factor used when the operation plan is prepared; and a control unit for preparing the operation plan based on the master information, the generated information, and the initial factor. The control unit performs a factor setting process of assigning a predetermined set value as the initial factor, an operation plan preparation process of preparing the operation plan based on the initial factor serving as the set value, the master information, and the generated information, and an operation plan evaluation process of evaluating a plurality of respective operation plans prepared by repeatedly performing the operation plan preparation process while varying the set value of the initial factor in the factor setting process, and deriving an optimum operation plan.

In addition, an operation plan preparation and evaluation method of the invention is an operation plan preparation and evaluation method of preparing an operation plan for a component used in equipment and evaluating the prepared operation plan, the operation plan preparation and evaluation method executing a factor setting step of assigning a predetermined set value as an initial factor used when the operation plan is prepared, an operation plan preparation step of preparing the operation plan based on the initial factor serving as the set value, master information related to the equipment and the component, and generated information related to the equipment and the component generated when the operation plan is prepared, and an operation plan evaluation step of evaluating a plurality of respective operation plans prepared by repeatedly performing the operation plan preparation step while varying the set value of the initial factor in the factor setting step, and deriving an optimum operation plan.

According to this configuration, an operation plan may be prepared based on master information, generated information, and an initial factor. In this instance, a plurality of operation plans may be prepared by varying a set value of the initial factor. In addition, an optimum operation plan may be derived by evaluating the plurality of respective operation plans.

Advantageously, in the operation plan preparation and evaluation device, the master information includes operation job master information related to an operation job of the equipment, the generated information includes individual article list information related to an individual usage condition of the component. The control unit performs a component extraction process of extracting the component, which is required for the operation job and is not currently used, based on the individual article list information, a priority assignment process of assigning priorities to a plurality of components extracted in the component extraction process, and a component selection process of excepting a predetermined quantity $m_i$ in descending order of priority from the components to which the priorities are assigned in the priority assignment process, and selecting components corresponding to a required quantity to be used in the operation job in descending order of priority from remaining components, and the predetermined quantity $m_i$ is treated as the initial factor in the factor setting process.

According to this configuration, it is possible to prepare a plurality of operation plans by varying a set value of a predetermined quantity $m_i$ corresponding to an initial factor. For this reason, an optimum operation plan related to a predetermined quantity $m_i$ may be derived by evaluating the plurality of respective operation plans related to varied predetermined quantities $m_i$.

Advantageously, in the operation plan preparation and evaluation device, the master information includes operation job master information related to an operation job of the equipment, the generated information includes individual article list information related to an individual usage condition of the component. The control unit performs a component extraction process of extracting the component, which is required for the operation job and is not currently used, based on the individual article list information, and a priority assignment process of assigning priorities to a plurality of components extracted in the component extraction process, the priorities are assigned to the components using a formula for computation represented by "priority=coefficient $\alpha_i$×residual life of component+(1−coefficient $\alpha_i$)×removing time of component removed at previous time" or a formula for computation represented by "priority=coefficient $\alpha_i \times$priority of residual life of component+(1−coefficient $\alpha_i$)×priority when removing time of component removed at previous time is arranged in time sequence" in the priority assignment process, and the coefficient $\alpha_i$ ($0 \leq \alpha_i \leq 1$) is treated as the initial factor in the factor setting process.

According to this configuration, a plurality of operation plans may be prepared by varying a set value of a coefficient $\alpha_i$ corresponding to an initial factor. For this reason, an optimum operation plan related to a coefficient $\alpha_i$ may be derived by evaluating the plurality of respective operation plans related to varied coefficients $\alpha_i$. Here, as an evaluation value calculated by a formula for computation related to a priority is smaller, the priority is higher.

Advantageously, in the operation plan preparation and evaluation device, the generated information includes information about an individual residual life of the component, an evaluation value of the operation plan is calculated using an evaluation function for evaluating the operation plan in the operation plan evaluation process, and the evaluation function is a function including, as a variable, at least one of a total residual life obtained by adding residual lives of all the components, a predetermined evaluation scale, a quantity of new components, and a quantity of discarded components.

According to this configuration, an evaluation value of a prepared operation plan may be derived using an evaluation function. For this reason, an operation plan having a smallest evaluation value may be evaluated as an optimum operation plan by comparing respective evaluation values corresponding to operation plans.

Advantageously, in the operation plan preparation and evaluation device, the evaluation scale is a weighted average of a purity $P_i$ of a used component in a predetermined operation job i of the equipment, when the number of operation jobs i is set to N, a set of components allocated to the operation jobs i is set to $C_i$, and a set of components previously allocated to h operation jobs among the components allocated to the operation jobs i is set to $A_h$, the weighted average of the purity $P_i$ corresponds to a formula for computation represented by "weighted average of purity $P_i = \Sigma_i \{ |C_i|/N) \times P_i \}$", and the purity $P_i$ corresponds to a formula for computation represented by "purity $P_i = (1/|C_i|)$ max$|C_i \wedge A_i|$", and the evaluation function is a function represented by "evaluation value=$w_1 \times$total residual life obtained by adding residual lives of all components+$w_2 \times$(1−weighted average of purities $P_i$)+$w_3 \times$quantity of new components+$w_4 \times$quantity of discarded components".

According to this configuration, an evaluation value of an operation plan may be obtained using the evaluation function, and thus an optimum operation plan may be evaluated. Here, $w_1$ to $w_4$ are weightings.

Advantageously, in the operation plan preparation and evaluation device, an event generation process of generating events including an operation start event in which operation of the equipment starts, and an operation end event in which the operation of the equipment is suspended, an operation start event process of simulating an operation of the component in the operation start event, and an operation end event process of simulating an operation of the component in the operation end event are performed in the operation plan preparation process. The initial factor is a factor for selecting the component used in the operation start event, and the component is selected based on the set value set in the factor setting process in the operation start event process.

According to this configuration, a plurality of operation plans may be prepared by varying an initial factor to change a condition related to selection of a component in an operation start event.

Advantageously, in the operation plan preparation and evaluation device, a test end event in which a test of the component ends, and a repair end event in which a repair of the component ends are generated in the event generation process, and a test end event process of simulating an operation of the component in the test end event, and a repair end event process of simulating an operation of the component in the repair end event are performed in the operation plan preparation process.

According to this configuration, an operation plan may be prepared by generating various events, and thus the operation plan may be accurately prepared.

According to another aspect of the present invention, an operation plan preparation and evaluation device for preparing an operation plan for a component used in equipment and evaluating the prepared operation plan comprises: a storage unit for storing master information related to the equipment and the component, generated information related to the equipment and the component generated when the operation plan is prepared, and an initial factor used when the operation plan is prepared; and a control unit for preparing the operation plan based on the master information, the generated information, and the initial factor. The control unit performs a factor setting process of assigning a predetermined set value as the initial factor, and an operation plan preparation process of preparing the operation plan based on the initial factor serving as the set value, the master information, and the generated information. An event generation process of generating events including an operation start event in which operation of the equipment starts, and an operation end event in which the operation of the equipment is suspended, an operation start event process of simulating an operation of the component in the operation start event, and an operation end event process of simulating an operation of the component in the operation end event are performed in the operation plan preparation process. The initial factor is a factor for selecting the component used in the operation start event, and the component is selected based on the set value set in the factor setting process in the operation start event process.

According to this configuration, an operation plan may be prepared based on master information, generated information, and an initial factor. In this instance, a plurality of operation plans may be prepared by varying a set value of the initial factor. For this reason, a useful operation plan in deriving an optimum operation plan may be prepared.

According to another aspect of the present invention, an operation plan preparation and evaluation device for preparing an operation plan for a component used in equipment and evaluating the prepared operation plan comprises: a storage unit for storing master information related to the equipment and the component, and generated information related to the equipment and the component generated when the operation plan is prepared; and a control unit for preparing the operation plan based on the master information and the generated information. The control unit performs an operation plan preparation process of preparing the operation plan based on the master information and the generated information, and an operation plan evaluation process of evaluating a plurality of respective operation plans prepared by the operation plan preparation process, and deriving an optimum operation plan. The generated information includes information about an individual residual life of the component, an evaluation value of the operation plan is calculated using an evaluation function for evaluating the operation plan in the operation plan evaluation process, and the evaluation function is a function including, as a variable, at least one of a total residual life obtained by adding residual lives of all the components, a predetermined evaluation scale, a quantity of new components, and a quantity of discarded components.

According to this configuration, an evaluation value of a prepared operation plan may be calculated using an evaluation function. For this reason, an operation plan having a smallest evaluation value may be evaluated as an optimum operation plan by comparing respective evaluation values corresponding to a plurality of operation plans.

BRIEF DESCRIPTION OF DRAWINGS

FIG. 3 is an explanatory diagram illustrating operation master data.

FIG. 4 is an explanatory diagram illustrating operation condition master data.

FIG. 5 is an explanatory diagram illustrating test master data.

FIG. 6 is an explanatory diagram illustrating component damage level master data.

FIG. 7 is an explanatory diagram illustrating repair master data.

FIG. 8 is an explanatory diagram illustrating event queue data.

FIG. 9 is an explanatory diagram illustrating individual article list data.

FIG. 10 is an explanatory diagram illustrating new input article list data.

FIG. 11 is an explanatory diagram illustrating discarded article list data.

FIG. 12 is an explanatory diagram illustrating job execution result data.

FIG. 13 is an explanatory diagram illustrating component allocation result data.

DESCRIPTION OF EMBODIMENTS

Hereinafter, an embodiment according to the invention will be described in detail based on drawings. It should be noted that the invention is not restricted by the embodiment. Further, a component in the embodiment below includes a component that can easily replace the component by those skilled in the art, or substantially the same component.

Embodiment

Figures 1, 2:
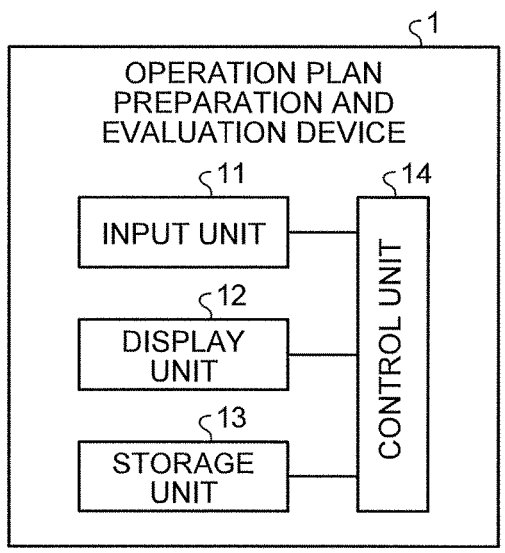
FIG. 1 is a schematic block diagram of an operation plan preparation and evaluation device according to the present embodiment.
FIG. 2 is an explanatory diagram illustrating component master data.
Figure 14:
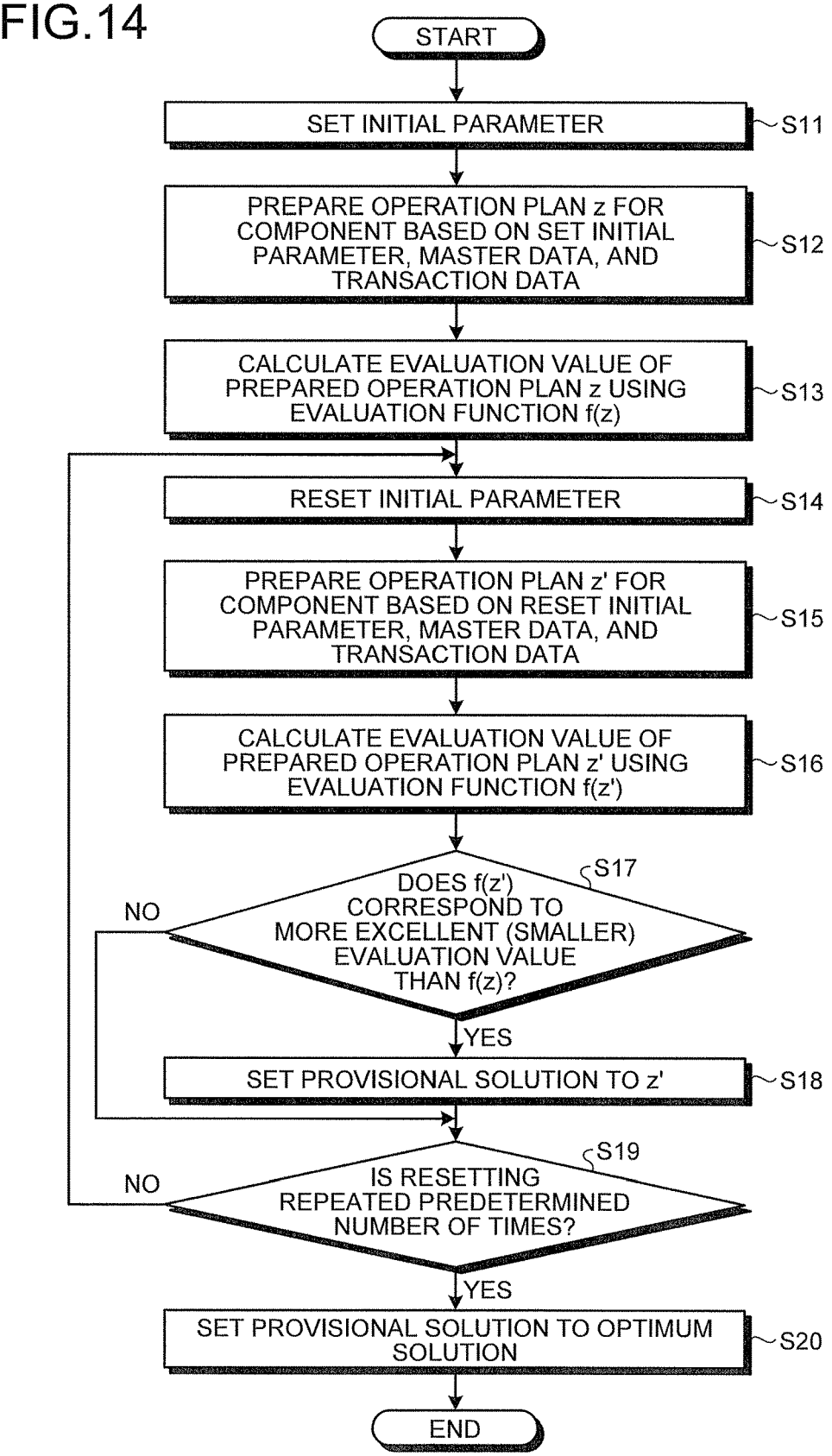
FIG. 14 is a flowchart of a control operation related to a component operation plan preparation and evaluation method.
Figure 15:
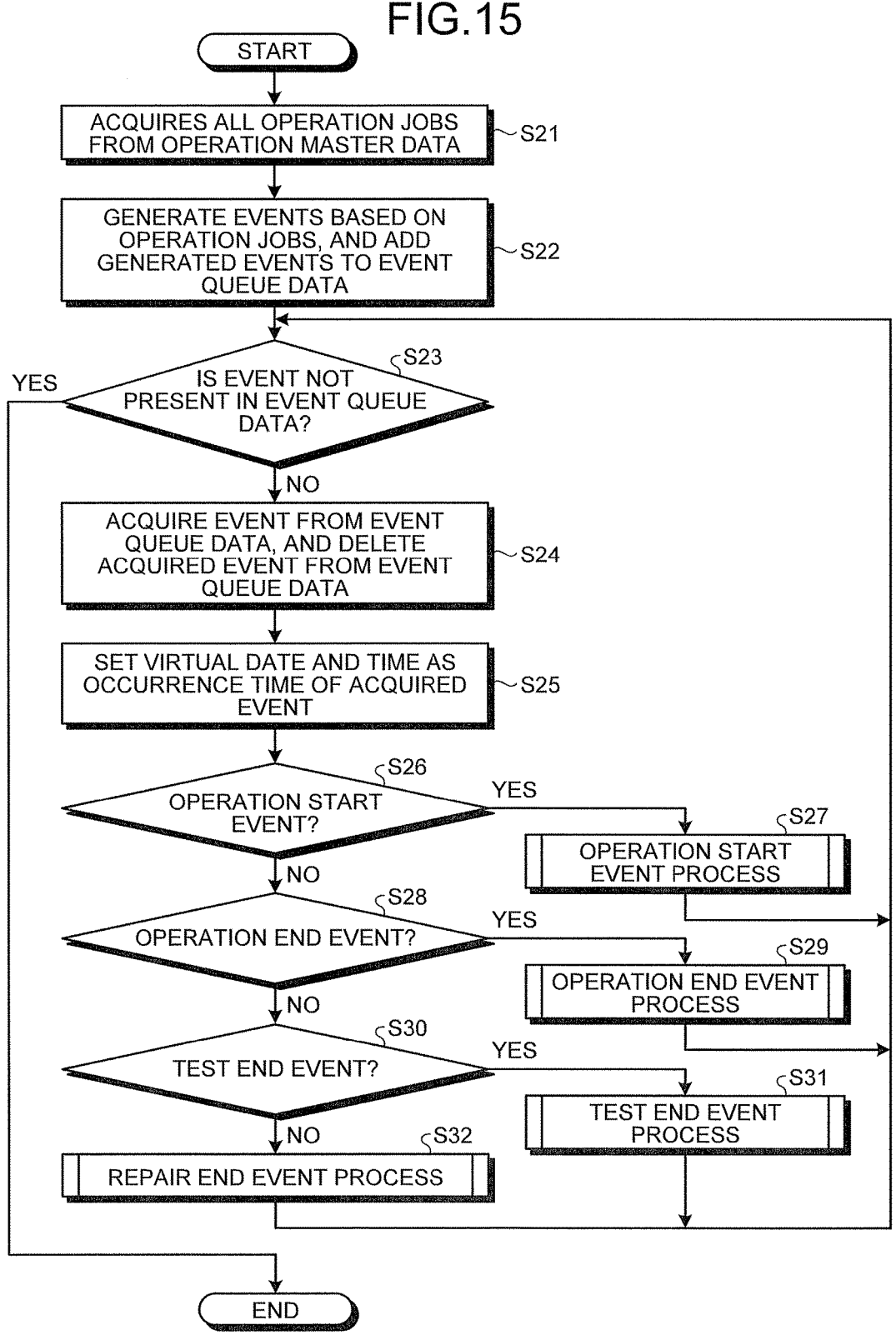
FIG. 15 is a flowchart of a control operation related to an operation plan preparation process for a component.
Figure 16:
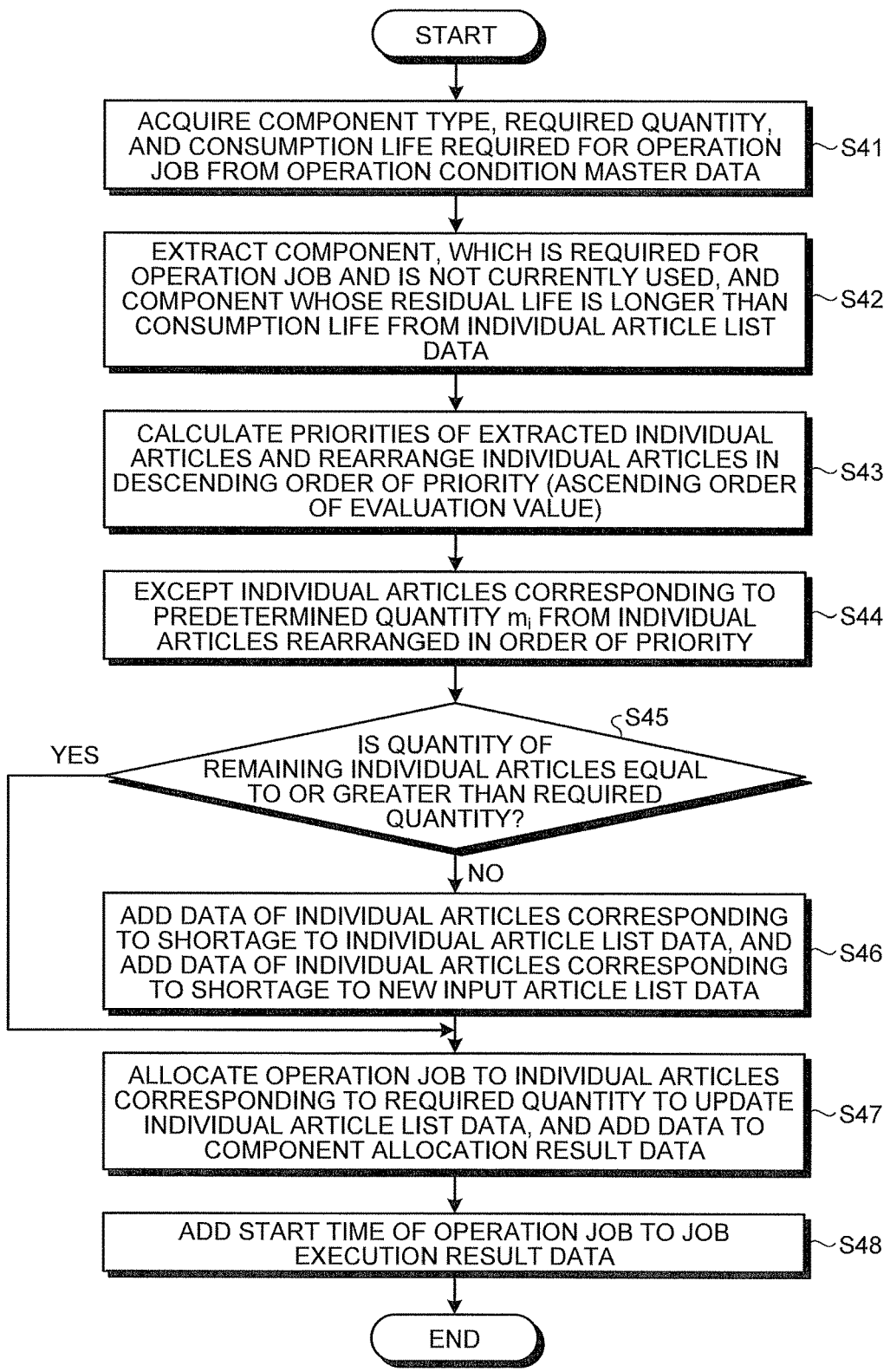
FIG. 16 is a flowchart of a control operation related to a operation start event process.
Figure 17:
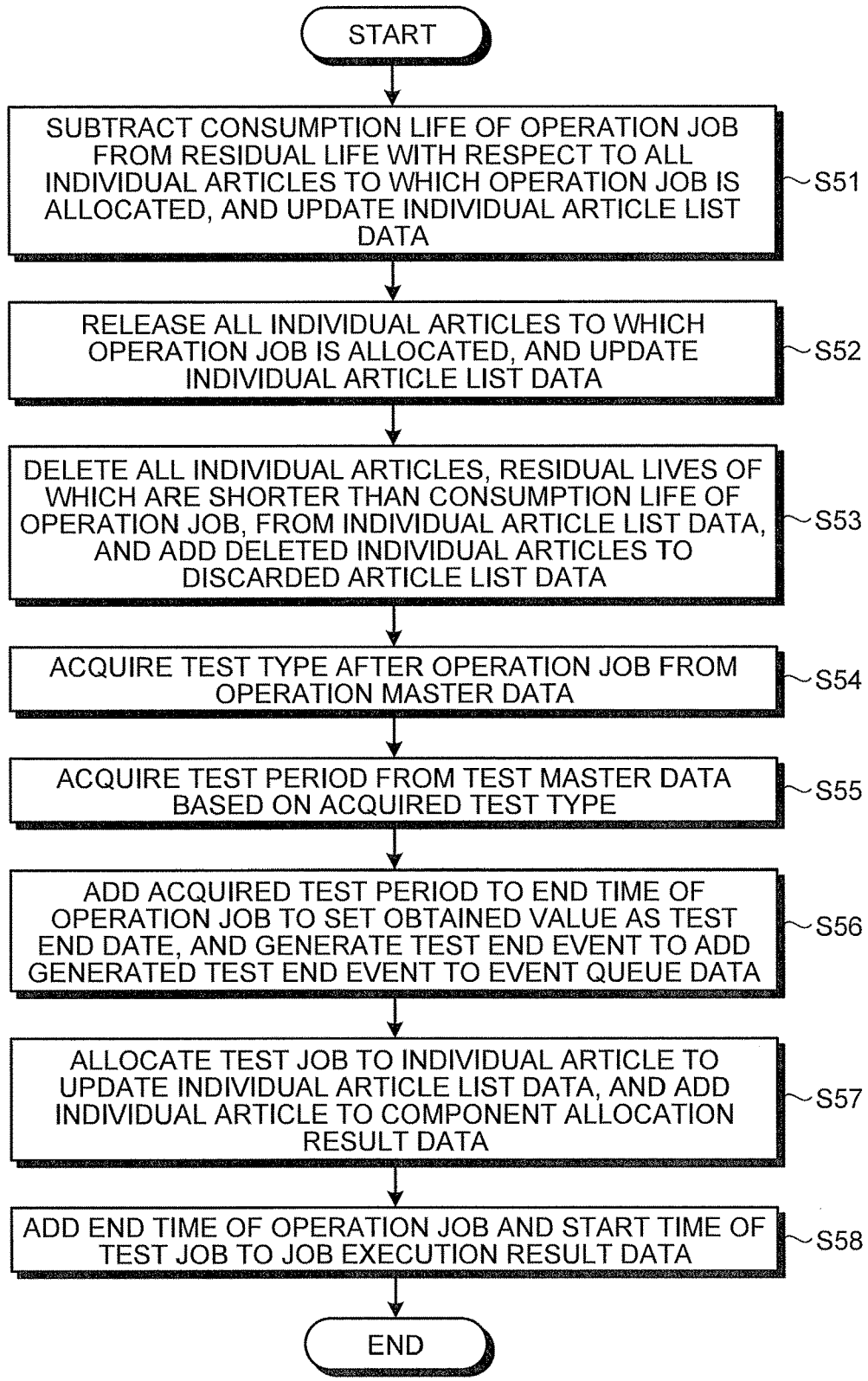
FIG. 17 is a flowchart of a control operation related to an operation end event process.
Figure 18:
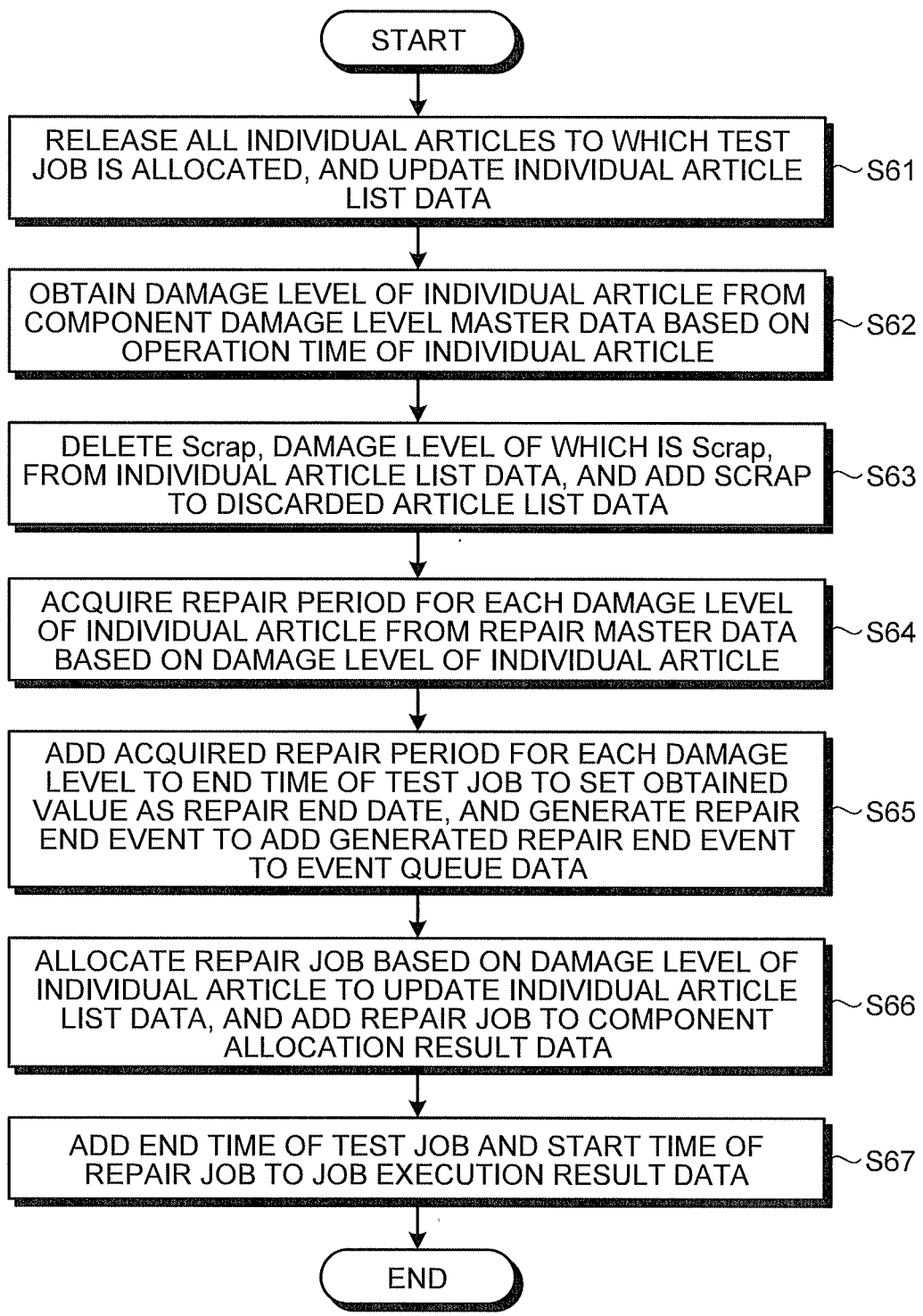
FIG. 18 is a flowchart of a control operation related to a test end event process.
Figure 19:
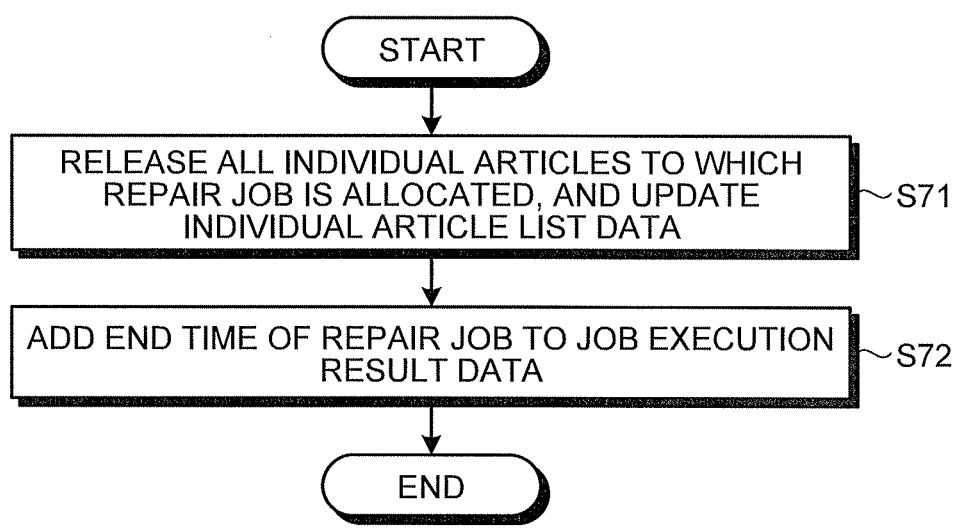
FIG. 19 is a flowchart of a control operation related to a repair end event process.
Figure 20:
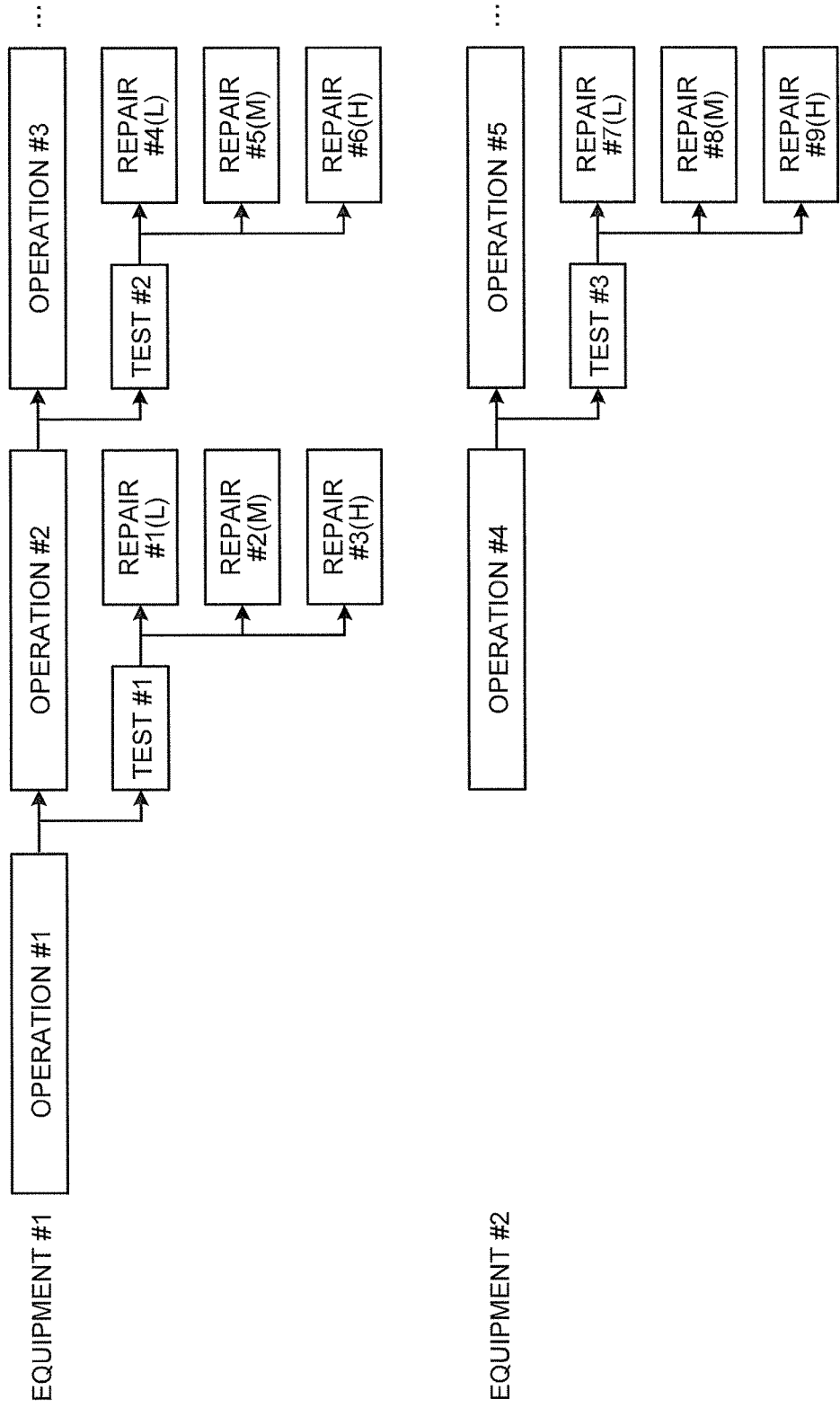
FIG. 20 is an explanatory diagram related to a flow of various jobs in each piece of equipment.
Figure 21:
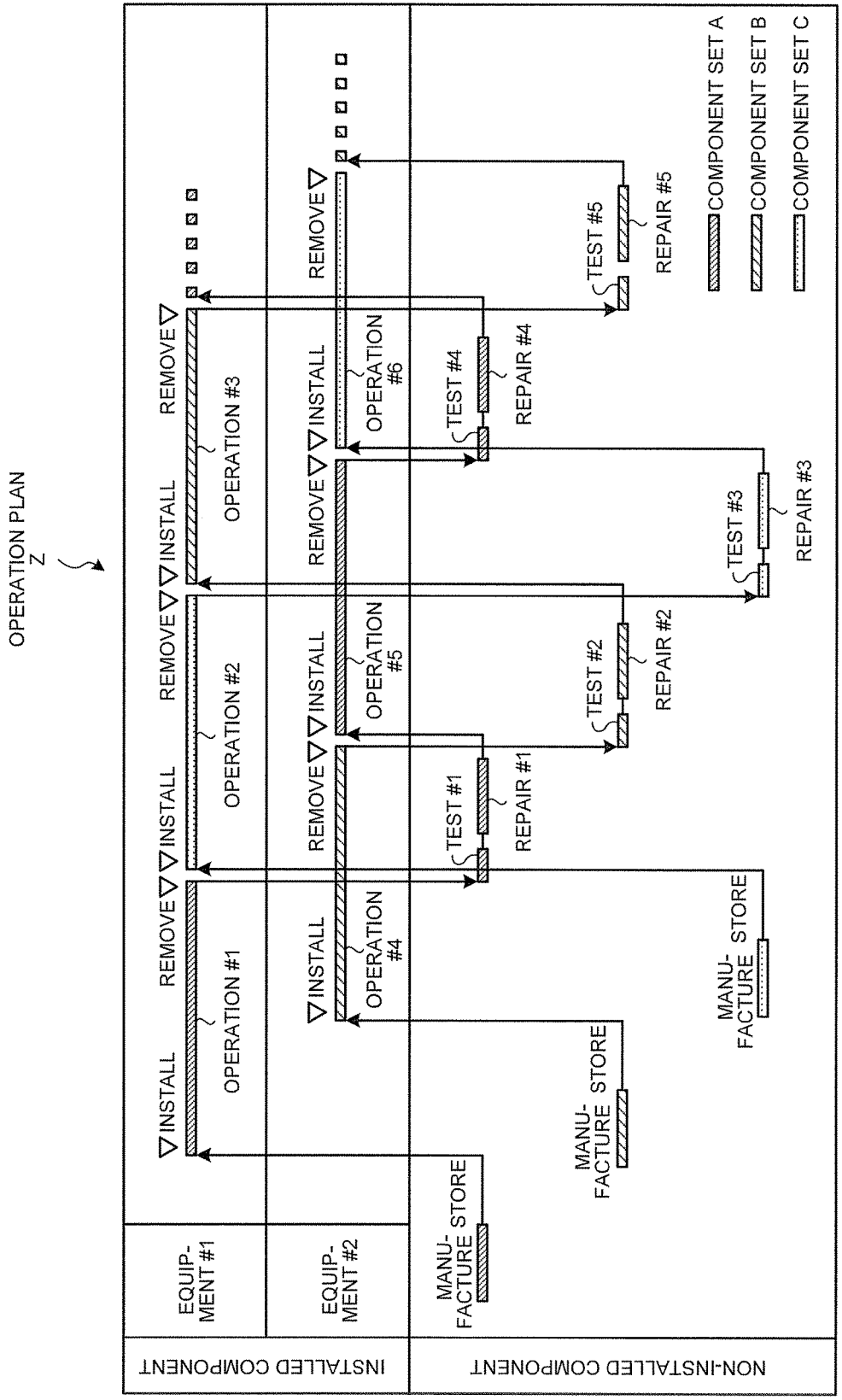
FIG. 21 is an explanatory diagram illustrating an execution result of each job based on an operation plan for a component prepared by the operation plan preparation and evaluation device of the present embodiment.

FIG. 1 is a schematic block diagram of an operation plan preparation and evaluation device according to the present embodiment. FIGS. 2 to 7 are explanatory diagrams illustrating various types of master data. FIGS. 8 to 13 are explanatory diagrams illustrating various types of transaction data. FIG. 14 is a flowchart of a control operation related to a component operation plan preparation and evaluation method. FIG. 15 is a flowchart of a control operation related to an operation plan preparation process for a component. FIG. 16 is a flowchart of a control operation related to an operation start event process. FIG. 17 is a flowchart of a control operation related to an operation end event process. FIG. 18 is a flowchart of a control operation related to a test end event process. FIG. 19 is a flowchart of a control operation related to a repair end event process. FIG. 20 is an explanatory diagram related to a flow of various jobs in each piece of equipment. FIG. 21 is an explanatory diagram related to an operation plan for a component prepared by the operation plan preparation and evaluation device of the present embodiment.

As illustrated in FIG. 1, an operation plan preparation and evaluation device 1 according to the present embodiment is a device for preparing an operation plan for a component and evaluating the prepared operation plan. Examples of the component, for which the operation plan is prepared in the device, includes a high-temperature component used in a gas turbine (equipment), and examples of the high-temperature component include a turbine blade.

Herein, the operation plan refers to a so-called management plan for planning to exchange a used high-temperature component with a spare component, or exchange a used high-temperature component with a repaired high-temperature component. This management is performed not only between a used component and a spare component prepared in advance for the same gas turbine, but also between a used component and a spare component prepared in advance for a different gas turbine having the same model or a repaired component of the same gas turbine or a different gas turbine having the same model.

The operation plan preparation and evaluation device 1 includes an input unit 11, a display unit 12, a storage unit 13, and a control unit 14. The input unit 11 includes an input device such as a key board, and outputs a signal corresponding to an operation, which is performed on the input device by an operator, to the control unit 14. The display unit 12 includes a display device such as a liquid crystal panel, and a display operation thereof is controlled by the control unit 14.

The storage unit 13 stores various programs and data. The programs stored in the storage unit 13 include an operation plan preparation program for preparing an operation plan for a component, an operation plan evaluation program for evaluating the prepared operation plan, or the like. In addition, the data stored in the storage unit 13 include master data (master information), transaction data (generated information), or the like used when the operation plan for the component is prepared.

The master data is basic data for preparing the operation plan for the component, and is invariable (fixed) data. As illustrated in FIGS. 2 to 7, examples of the master data include component master data D1, operation master data D2, operation condition master data D3, test master data D4, and component damage level master data D5, repair master data D6.

As illustrated in FIG. 2, the component master data D1 is master data including basic information related to a component, and is data that relates a component number, a component type, a component division, a design life, and a manufacturing cost. For example, the component number is treated as "component #1", "component #2", or the like, and is information for identifying a component. For example, the component type is treated as "component type #1", "component type #2", or the like, and is information for identifying a type of a component. For example, the component division is treated as "division #1", "division #2", or the like, and is information for identifying a division of a component. The design life is information related to a design life of a component. The manufacturing cost is information related to a manufacturing cost of a component.

As illustrated in FIG. 3, the operation master data D2 is master data including basic information related to an operation of a gas turbine, and is data that relates an operation job ID, equipment, a start time, an end time, and a test type after operation. For example, the operation job ID is treated as "operation #1", "operation #2", or the like, and is information for identifying an operation of a gas turbine in a predetermined period. For example, the equipment is treated as "equipment #1", "equipment #2", or the like, and is information for identifying equipment (for example, a serial number) of a gas turbine. The start time is information related to a start time of operation of a gas turbine in predetermined equipment. The end time is information related to an end time of operation of a gas turbine in predetermined equipment. The test type after operation is information related to a type of a test performed after operation of a gas turbine ends.

As illustrated in FIG. 4, the operation condition master data D3 is master data including basic information related to an operation condition of a gas turbine, and is data that relates an operation job ID, equipment, a required component type, a required component division, a required quantity, and a consumption life. The operation job ID and the equipment are the same as those of the above master data, and a description thereof will not be given. The required component division is information about a component division required in a predetermined operation job ID. The required quantity is information related to a quantity of components required in a predetermined operation job ID. The consumption life is information related to a life of a component consumed in a predetermined operation job ID. Herein, when a predetermined operation job ends, a consumption life corresponding to a predetermined operation job ID is added to an operation time of an individual article illustrated in FIG. 9 described below. For this reason, a residual life of a component may be calculated based on a formula for computation of "residual life=design life−operation time of individual article" in which an operation time of an individual article illustrated in FIG. 9 is subtracted from a design life.

As illustrated in FIG. 5, the test master data D4 is master data including basic information related to a test, and is data that relates a test type ID and a test period. For example, the test type ID is treated as "test #1", "test #2", or the like, and is information for identifying a type of a test. The test period is information related to a period of a test required in a predetermined test type.

As illustrated in FIG. 6, the component damage level master data D5 is master data including basic information related to a damage level of a component, and is data that relates equipment, a component type, an operation time, a component damage level, and a proportion. The equipment and the component type are the same as those of the above master data, and a description thereof will not be given. The operation time is information related to a cumulative operation time of a component, and different operation time ranges (for example, 0 to 12,000 and 12,001 to 24,000) are allocated to a predetermined component. The component damage level is information for identifying a type of a damage level of a component, and examples of the type of the damage level include "No Damage", "Light", "Medium", "Heavy", and "Scrap (discard)". The proportion is information indicating a proportion of components reaching a predetermined damage level.

As illustrated in FIG. 7, the repair master data D6 is master data including basic information related to repair, and is data that relates equipment, a component type, a component damage level (damage level), a repair period, and repair cost. The equipment, the component type, and the component damage level are the same as those of the above master data, and a description thereof will not be given. The repair period is information related to a repair period required in response to a damage level of a component. The repair cost is information related to repair cost required in response to a damage level of a component.

Next, the transaction data is data generated or updated when an operation plan for a component is prepared, and is variable data. As illustrated in FIGS. 8 to 13, examples of the transaction data include event queue data D7, individual article list data D8, new input article list data D9, discarded article list data D10, job execution result data D11, component allocation result data D12, and the like.

As illustrated in FIG. 8, the event queue data D7 is data obtained by listing various events as a queue in sequence of occurrence date, and is data that relates an event ID, an event type, a job ID, and an occurrence date. The event ID is information for identifying an occurring event. The event type is information for identifying a type of an occurring event, and examples of the event include an operation start event, an operation end event, a test end event, and a repair end event. The job ID is information for identifying a type of a job, and examples of the job include an operation job, a test job, and a repair job. The occurrence date is information related to an occurrence time of an event.

As illustrated in FIG. 9, the individual article list data D8 is data related to a usage condition of an individual component (hereinafter referred to as an individual article), and is data that relates an individual article ID, a component type, a component division, an operation time, and an allocated job ID. The component type and the component division are the same as those of the above master data and transaction data, and thus a description thereof will not be given. The individual article ID is information for identifying an individual article. The operation time is information related to a cumulative operation time of an individual article. The allocated job ID is information related to a job allocated to a predetermined individual article.

As illustrated in FIG. 10, the new input article list data D9 is data related to a list of newly input individual articles, and is data that relates an individual article ID, a component type, a component division, a component number, an operation time, and an input date. The individual article ID, the component type, the component division, the component number, and the operation time are the same as those of the above master data and transaction data, and thus a description thereof will not be given. The input date is information related to an input time of a newly input individual article.

As illustrated in FIG. 11, the discarded article list data D10 is data related to a list of discarded individual articles, and is data that relates an individual article ID, a component type, a component division, a component number, an operation time, and a discard date. The individual article ID, the component type, the component division, the component number, and the operation time are the same as those of the above master data and transaction data, and thus a description thereof will not be given. The discard date is information related to a discard time of a discarded individual article.

As illustrated in FIG. 12, the job execution result data D11 is data of a history related to various executed jobs, and is data that relates a job ID, a job type, a start date, and an end date. The job ID is the same as that of the above transaction data, and thus a description thereof will not be given. The job type is information related to a type of a job. The start date is information related to a start time of a predetermined job. The end date is information related to an end time of a predetermined job.

As illustrated in FIG. 13, the component allocation result data D12 is data related to a history of an allocated job of an individual article, and is data that relates an individual article ID, a component type, a component division, and an allocated job ID. The individual article ID, the component type, the component division, and the allocated job ID are the same as those of the above master data and the transaction data, and thus a description thereof will not be given.

The control unit 14 includes an integrated circuit, and performs various processes by executing a predetermined program. Specifically, the control unit 14 performs an operation plan preparation process of preparing an operation plan for a component by executing an operation plan preparation program stored in the storage unit 13, or performs an operation plan evaluation process of evaluating the prepared operation plan for the component by executing an operation plan evaluation program stored in the storage unit 13.

The operation plan preparation process is a process of preparing an operation plan based on the above master data and transaction data. An event generation process, an operation start event process, an operation end event process, a test end event process, and a repair end event process are performed in the operation plan preparation process. The event generation process is a process of generating various events. For example, an operation start event, an operation end event, a test end event, and a repair end event are generated, and the generated events are added to the event queue data D7. The operation start event process is a process of simulating an operation of a component in the operation start event, and details thereof will be described below. The operation end event process is a process of simulating an operation of a component in the operation end event, and details of this process will be described below. The test end event process is a process of simulating an operation of a component in the test end event, and details of this process will be described below. The repair end event process is a process of simulating an operation of a component in the repair end event, and details of this process will be described below.

Herein, in the operation plan preparation process, a component is selected based on an initial parameter (initial factor) for selecting a component in the operation start event in addition to the above master data and transaction data, and an operation plan for a component is prepared based on the component selected in the operation start event. In other words, upon performing the operation plan preparation process, the control unit 14 performs a factor setting process of assigning a predetermined set value as an initial parameter. Details of the factor setting process will be described below.

In the operation plan evaluation process, an evaluation value of an operation plan is calculated using an evaluation function for evaluating an operation plan. The evaluation function is a function including, as a variable, at least one of a total residual life obtained by adding residual lives of all individual articles, a predetermined evaluation scale, a quantity of new components, and a quantity of discarded components in a prepared operation plan. Specifically, an evaluation function $f(z)$ is "$f(z)=w_1 \times \Sigma_k$ residual life of individual article k (total residual life obtained by adding residual lives of all individual articles)+$w_2 \times$(1−weighted average of purities $P_i$ (evaluation scale)+$w_3 \times$quantity of new components+$w_4 \times$quantity of discarded components". Here, k is the total number of individual articles. As a calculated evaluation value is smaller, an evaluation value of the evaluation function $f(z)$ is more excellent. Herein, it is presumed that the number of operation jobs i is N, a set of individual articles allocated to the operation jobs i is $C_i$, and a set of individual articles previously allocated to h operation jobs among the individual articles allocated to the operation jobs i is $A_h$. In this instance, a weighted average of a purity $P_i$ corresponds to a formula for computation represented in Equation (1) below, and the purity $P_i$ corresponds to a formula for computation represented in Equation (2) below. Here, $w_1$ to $w_4$ are coefficients of a weighting, and are set to coefficients at which an error is smallest at the time of evaluating an operation plan.

$$\text{Weighted average of purity } P_i = \Sigma_i \{(|C_i|/N) \times P_i\} \qquad (1)$$

$$\text{Purity } P_i = (1/|C_i|)\max|C_i \cap A_i| \qquad (2)$$

In Equation (1), a weighted average of a purity $P_i$ is applied as an evaluation scale. However, instead, it is possible to apply the number H of previously allocated operation jobs among individual articles allocated to operation jobs i, or it is possible to apply entropy in so-called clustering analysis. The application is not particularly restricted.

Next, a description will be given of a control operation related to an operation plan preparation and evaluation method of preparing an operation plan and evaluating the prepared operation plan based on the above master data and transaction data with reference to FIG. 14.

First, the control unit 14 of the operation plan preparation and evaluation device 1 performs a factor setting process to set a predetermined set value as an initial parameter for selecting a component in an operation start event (step S11: factor setting step). The control unit 14 performs an operation plan preparation process to prepare an operation plan z for a component based on the set initial parameter, master data, and transaction data (step S12: operation plan preparation step). Details of a control operation related to preparation of the operation plan for the component will be described below. In addition, the control unit 14 performs an operation plan evaluation process to calculate an evaluation value of the prepared operation plan z for the component using an evaluation function $f(z)$ (step S13: operation plan evaluation step).

Thereafter, the control unit 14 performs a factor setting process to reset an initial parameter different from the initial parameter set in step S11 (step S14: factor setting step). The control unit 14 performs an operation plan preparation process to prepare an operation plan z' for the component based on the reset initial parameter, the master data, and the transaction data (step S15: operation plan preparation step). Then, the control unit 14 performs an operation plan evaluation process to calculate an evaluation value of the prepared operation plan z' for the component using an evaluation function f(z') (step S16: operation plan evaluation step).

Then, the control unit 14 determines whether an evaluation value f(z') of the operation plan z' calculated in step S16 is an evaluation value more excellent than an evaluation value f(z) of the operation plan z calculated in step S13 (step S17). In other words, when the evaluation value f(z') is an evaluation value smaller than the evaluation value f(z) (f(z')<f(z)), the evaluation value f(z') is a more excellent evaluation value than the evaluation value f(z). On the other hand, when the evaluation value f(z') is an evaluation value larger than the evaluation value f(z) (f(z')>f(z)), the evaluation value f(z') is not a more excellent evaluation value than the evaluation value f(z). When f(z') is determined to be a more excellent evaluation value than f(z) (step S17: Yes), the control unit 14 sets a provisional solution to the operation plan z' (step S18), and proceeds to a subsequent step S19. On the other hand, when f(z') is determined to be not a more excellent evaluation value than f(z) (step S17: No), the control unit 14 proceeds to a subsequent step S19 without performing step S18.

In step S19, the control unit 14 determines whether resetting of an initial parameter is repeated a predetermined number of times. In other words, an operation plan for a component is prepared once for one setting of an initial parameter. For this reason, operation plans for a component corresponding to set initial parameters are prepared. In this instance, set initial parameters are gradually changed from another initial parameter. The control unit 14 may determine that the resetting of the initial parameter is repeated the predetermined number of times in step S19 when operation plans for a component are prepared for all initial parameters arranged in advance. In addition, in step S19, the control unit 14 may determine that the resetting of the initial parameter is repeated the predetermined number of times if the provisional solution is not updated even when the resetting is repeated the predetermined number of times. In other words, the predetermined number of times in step S19 may be arbitrarily set.

When the resetting is determined to be repeated the predetermined number of times (step S19: Yes) in step S19, the control unit 14 sets the provisional solution as an optimum solution (step S20), and terminates the control operation related to the operation plan preparation and evaluation method. On the other hand, when the resetting is determined to be not repeated the predetermined number of times (step S19: No) in step S19, the control unit 14 proceeds to step S14 again, and performs the control operation after step S14. As described above, the control unit 14 prepares an operation plan for a component a predetermined number of times while gradually changing an initial parameter, and derives an operation plan corresponding to an excellent evaluation value (a small evaluation value).

Next, a description will be given of a control operation related to preparation of an operation plan for a component with reference to FIG. 15. The operation plan for the component is prepared by simulating management of the component in accordance with a virtual date and time.

First, the control unit 14 of the operation plan preparation and evaluation device 1 acquires information related to all operation jobs from the operation master data D2 stored in the storage unit 13 (step S21). Then, the control unit 14 performs the event generation process to generate events based on the acquired operation jobs, and add the events to the event queue data D7 in sequence of occurrence date (step S22).

Subsequently, the control unit 14 determines whether the event is present in the event queue data D7 (step S23). When no event is determined to be present in the event queue data D7 (step S23: Yes), the control unit 14 terminates a control operation related to preparation of an operation plan for a component. On the other hand, when an event is determined to be present in the event queue data D7 (step S23: No), the control unit 14 acquires the event from the event queue data D7, and deletes the acquired event from the event queue data D7 (step S24). Upon acquiring the event, the control unit 14 sets a virtual date and time as an occurrence date (occurrence time) of the acquired event (step S25).

Subsequently, the control unit 14 determines whether the acquired event is an operation start event (step S26). When the acquired event is determined to be the operation start event (step S26: Yes), the control unit 14 performs an operation start event process (step S27), and proceeds to step S23 again. The operation start event process will be described below. On the other hand, when the acquired event is determined to be not the operation start event in step S26 (step S26: No), the control unit 14 proceeds to step S28.

Subsequently, the control unit 14 determines whether the acquired event is an operation end event in step S28. When the acquired event is determined to be the operation end event (step S28: Yes), the control unit 14 performs an operation end event process (step S29), and proceeds to step S23 again. The operation end event process will be described below. On the other hand, when the acquired event is determined to be not the operation end event in step S28 (step S28: No), the control unit 14 proceeds to step S30.

In addition, the control unit 14 determines whether the acquired event is a test end event in step S30. When the acquired event is determined to be the test end event (step S30: Yes), the control unit 14 performs a test end event process (step S31), and proceeds to step S23 again. The test end event process will be described below. On the other hand, when the acquired event is determined to be not the test end event in step S30 (step S30: No), the control unit 14 proceeds to step S32.

In step S32, the control unit 14 presumes that the acquired event is a repair end event, and performs a repair end event process (step S32). Then, the control unit 14 proceeds to step S23 again.

In this way, the control unit 14 performs various event processes until no event is left in the event queue data D7.

Next, a description will be given of a control operation related to the operation start event process with reference to FIG. 16. Upon performing the operation start event process in step S27 of FIG. 15, the control unit 14 first acquires a component type, a required quantity, and a consumption life required for an operation job from the operation condition master data D3 (step S41). Thereafter, the control unit 14 performs a component extraction process of extracting a component (individual article), which is required for the operation job and is not currently used, based on the individual article list data D8. In other words, the control unit 14 performs the component extraction process to extract an individual article whose job is not allocated to an allocated job ID of the individual article list data D8 among individual articles required for the operation job, and extract a component whose residual life of an individual article (=design life−operation time of individual article) is longer than a consumption life from the individual article list data D8 (step S42).

Subsequently, the control unit 14 performs a priority assignment process of assigning priorities to a plurality of extracted individual articles (step S43). Herein, in the priority assignment process, priorities are assigned to individual articles using a formula for computation represented by "priority=coefficient $\alpha_i$×residual life of individual article+(1−coefficient $\alpha_i$)×removing time of individual article removed at a previous time". In the formula for computation related to the priorities, a priority is higher as a calculated evaluation value is smaller. In addition, the control unit 14 arranges the individual article in descending order of calculated priority. In this instance, a coefficient $\alpha_i$ is in a range of $0 \leq \alpha_i \leq 1$, and is treated as an initial parameter. In other words, a coefficient $\alpha_i$ is a coefficient that determines a ratio of a residual life of an individual article to a removing time of an individual article removed at a previous time. In addition, the control unit 14 sets the coefficient $\alpha_i$ as a predetermined set value in setting of the initial parameter in step S11 and step S14 of FIG. 14. A formula for computation of a priority is not restricted to the above formula for computation, and it is possible to use a formula for computation represented by "priority=coefficient $\alpha_i$×priority of residual life of component+(1−coefficient $\alpha_i$)×priority of removing time of individual article removed at a previous time".

Subsequently, the control unit 14 performs a component selection process of selecting an individual article from among the individual articles arranged in descending order of priority (step S44). Herein, in the component selection process, excepting individual articles corresponding to a predetermined quantity $m_i$ in descending order of priority from the individual articles to which the priorities are assigned, individual articles corresponding to a required quantity used in an operation job are selected in descending order of priority from remaining individual articles. In this instance, the predetermined quantity $m_i$ is treated as an initial parameter. For this reason, the control unit 14 sets the predetermined quantity $m_i$ as a predetermined set value in setting of the initial parameter in step S11 and step S14 of FIG. 14.

In step S45, the control unit 14 determines whether a quantity of the remaining individual articles is equal to or greater than the required quantity when the individual articles corresponding to the predetermined quantity $m_i$ are excepted (step S45). When the quantity of the remaining individual articles is determined to be equal to or greater than the required quantity (step S45: Yes), the control unit 14 allocates an operation job to the individual articles corresponding to the required quantity to update the individual article list data D8, and adds (records) the data to the component allocation result data D12 (step S47). On the other hand, when the quantity of the remaining individual articles is determined to be less than the required quantity (step S45: No), the control unit 14 adds data of individual articles corresponding to a shortage to the individual article list data D8, adds the data of the individual articles corresponding to the shortage to the new input article list data D9 (step S46), and then proceeds to step S47. Further, after performing step S47, the control unit 14 adds (records) a start time of an operation job to the job execution result data D11 (step S48), ends the control operation of the operation start event process, and proceeds to step S23 of FIG. 15.

Next, a description will be given of a control operation related to the operation end event process with reference to FIG. 17. Upon performing the operation end event process in step S29 of FIG. 15, first, the control unit 14 subtracts a consumption life of an operation job from a residual life of an individual article with respect to all individual articles to which the operation job is allocated, and updates the individual article list data D8 (step S51). Thereafter, the control unit 14 releases the all individual articles to which the operation job is allocated (cancel allocation), and updates the individual article list data D8 (step S52). In addition, the control unit 14 deletes all individual articles, residual lives of which are shorter than the consumption life of the operation job, included in the operation master data D2 from the individual article list data D8, and adds (records) the deleted individual articles to the discarded article list data D10 (step S53).

Subsequently, the control unit 14 acquires a test type after the operation job from the operation master data D2 (step S54). The control unit 14 acquires a test period from the test master data D4 based on the acquired test type (step S55). The control unit 14 adds the acquired test period to an end time of the operation job to set a value, which is obtained by adding the test period to the end time, as a test end date (occurrence date), and generates a test end event to add (record) the generated test end event to the event queue data D7 (step S56). The control unit 14 allocates a test job to an individual article to update the individual article list data D8, and adds (records) the individual article to the component allocation result data D12 (step S57). Then, the control unit 14 terminates the control operation related to the operation end event process by adding (recording) an end time of the operation job and a start time of the test job to the job execution result data D11 (step S58).

Next, a description will be given of a control operation related to the test end event process with reference to FIG. 18. Upon performing the test end event process in step S31 of FIG. 15, first, the control unit 14 releases all individual articles to which a test job is allocated (cancel allocation), and updates the individual article list data D8 (step S61). The control unit 14 obtains a damage level of an individual article from the component damage level master data D5 based on an operation time recorded in the individual article list data D8 (step S62). In addition, the control unit 14 deletes a scrap (discarded component), a damage level of which is "Scrap", from the individual article list data D8, and adds (records) the scrap to the discarded article list data D10 (step S63).

Subsequently, the control unit 14 acquires a repair period for each damage level of an individual article from the repair master data D6 based on a damage level of the individual article with respect to individual articles other than individual articles corresponding to "Scrap" and "No Damage" (step S64). The control unit 14 adds the acquired repair period for each damage level to an end time of a test job to set a value, which is obtained by adding the repair period to the end time, as a repair end date (occurrence date), and generates a repair end event to add (record) the generated repair end event to the event queue data D7 (step S65). The control unit 14 allocates a repair job based on a damage level of an individual article to update the individual article list data D8, and adds (records) the repair job to the component allocation result data D12 (step S66). In this instance, in step S66, with regard to an individual article corresponding to "No Damage", no repair is required, and thus the individual article list data D8 is updated without allocating a repair job. In addition, the control unit 14 terminates the control operation related to the test end event process by adding (recording) an end time of the test job and a start time of the repair job to the job execution result data D11 (step S67).

Next, a description will be given of a control operation related to the repair end event process with reference to FIG. 19. Upon performing the repair end event process in step S32 of FIG. 15, first, the control unit 14 releases all individual articles to which a repair job is allocated (cancel allocation), and updates the individual article list data D8 (step S71). In addition, the control unit 14 terminates the control operation related to the repair end event process by adding (recording) an end time of the repair job to the job execution result data D11 (step S72).

As described above, the control unit 14 generates the job execution result data D11 and the component allocation result data D12 by performing the operation plan preparation process, and prepares an operation plan for a component based on the job execution result data D11 and the component allocation result data D12.

Herein, a description will be given of a flow of various jobs in each piece of equipment based on the job execution result data D11 prepared in the operation plan preparation process with reference to FIG. 20. As described in the foregoing, examples of the jobs include an operation job, a test job, and a repair job. The operation job is determined in advance based on an operation plan for equipment. Similarly, the test job is determined in advance according to the operation job. The repair job is appropriately determined according to a damage level based on an operation time of an individual article. The operation job, the test job, and the repair job are determined according to each piece of equipment. These jobs are performed according to virtual dates and times. First, a predetermined operation job is performed, and a test job is performed after the operation job ends. In addition, after the test job ends, a repair job is performed. Meanwhile, operation jobs may be continuously performed according to predetermined virtual dates and times. In this case, an individual article used in a previous operation job may not be used in a subsequent operation job.

Next, a description will be given of an example of an operation plan z for a component prepared in the operation plan preparation process with reference to FIG. 21. The operation plan z for the component includes the new input article list data D9 of FIG. 10, the discarded article list data D10 of FIG. 11, the job execution result data D11 of FIG. 12, the component allocation result data D12 of FIG. 13, or the like. As illustrated in FIG. 21, in the operation plan z for the component prepared based on the job execution result data D11, an operation job in equipment #1 is continuously performed in order of operation #1, operation #2, and operation #3, and an operation job in equipment #2 is continuously performed in order of operation #4, operation #5, and operation #6.

Herein, for example, a component set A installed in an operation job of operation #1 in equipment #1 is a manufactured, stored, and newly input component. After operation of operation #1, the component set A is removed. Then, after a test job of test #1 is performed, a repair job of repair #1 is performed. The component set A subjected to repair #1 is installed in an operation job of operation #5 in equipment #2. After operation of operation #5, the component set A is removed. Then, after a test job of test #4 is performed, a repair job of repair #4 is performed.

In addition, for example, a component set B installed in an operation job of operation #4 in equipment #2 is a manufactured, stored, and newly input component. After operation of operation #4, the component set B is removed. Then, after a test job of test #2 is performed, a repair job of repair #2 is performed. The component set B subjected to repair #2 is installed in an operation job of operation #3 in equipment #1. After operation of operation #3, the component set B is removed. Then, after a test job of test #5 is performed, a repair job of repair #5 is performed.

In addition, for example, a component set C installed in an operation job of operation #2 in equipment #1 is a manufactured, stored, and newly input component. After operation of operation #2, the component set C is removed. Then, after a test job of test #3 is performed, a repair job of repair #3 is performed. The component set C subjected to repair #3 is installed in an operation job of operation #6 in equipment #2. After operation of operation #6, the component set C is removed.

As described in the foregoing, according to a configuration of the present embodiment, an operation plan z for a component may be prepared based on master data, transaction data, and an initial parameter. In this instance, it is possible to prepare a plurality of operation plans z for the component by varying a set value of the initial parameter. Further, an optimum operation plan z may be derived by evaluating the plurality of respective operation plans z.

In addition, according to a configuration of the present embodiment, it is possible to prepare a plurality of operation plans z by varying a set value of a predetermined quantity $m_i$ corresponding to an initial parameter. For this reason, an optimum operation plan z related to a predetermined quantity $m_i$ may be derived by evaluating the plurality of respective operation plans z related to varied predetermined quantities $m_i$.

In addition, according to a configuration of the present embodiment, a plurality of operation plans z may be prepared by varying a set value of a coefficient $\alpha_i$ corresponding to an initial parameter. For this reason, an optimum operation plan z related to a coefficient $\alpha_i$ may be derived by evaluating the plurality of respective operation plans z related to varied coefficients $\alpha_i$.

In addition, according to a configuration of the present embodiment, an evaluation value of a prepared operation plan z may be derived using an evaluation function f(z). For this reason, an operation plan z having a highest evaluation value may be evaluated as an optimum operation plan by comparing respective evaluation values corresponding to operation plans z.

In addition, according to a configuration of the present embodiment, an evaluation value of an operation plan z may be obtained using a formula for computation of an evaluation function f(z), and thus an optimum operation plan z may be evaluated.

In addition, according to a configuration of a first embodiment, a plurality of operation plans z may be prepared by varying an initial parameter to change a condition related to selection of a component in an operation start event.

In addition, according to a configuration of the first embodiment, an operation plan z may be prepared by generating various events, and thus the operation plan z may be accurately simulated and prepared.

REFERENCE SIGNS LIST

1 OPERATION PLAN PREPARATION AND EVALUATION DEVICE
11 INPUT UNIT
12 DISPLAY UNIT
13 STORAGE UNIT
14 CONTROL UNIT
D1 COMPONENT MASTER DATA

D2 OPERATION MASTER DATA
D3 OPERATION CONDITION MASTER DATA
D4 TEST MASTER DATA
D5 COMPONENT DAMAGE LEVEL MASTER DATA
D6 REPAIR MASTER DATA
D7 EVENT QUEUE DATA
D8 INDIVIDUAL ARTICLE LIST DATA
D9 NEW INPUT ARTICLE LIST DATA
D10 DISCARDED ARTICLE LIST DATA
D11 JOB EXECUTION RESULT DATA
D12 COMPONENT ALLOCATION RESULT DATA
z OPERATION PLAN

The invention claimed is:

1. An operation plan preparation and evaluation device for preparing an operation plan for a component used in equipment and evaluating the prepared operation plan, the operation plan preparation and evaluation device comprising:
    storage for storing master information related to the equipment and the component, generated information related to the equipment and the component generated when the operation plan is prepared, and an initial factor used when the operation plan is prepared; and
    an integrated circuit for preparing the operation plan based on the master information, the generated information, and the initial factor,
    wherein the integrated circuit performs
        a factor setting process of assigning a predetermined set value as the initial factor,
        an operation plan preparation process of preparing the operation plan based on the initial factor serving as the set value, the master information, and the generated information,
        an operation plan evaluation process of evaluating a plurality of respective operation plans prepared by repeatedly performing the operation plan preparation process while varying the set value of the initial factor in the factor setting process, and deriving an optimum operation plan, and
        causing the optimum operation plan for the component to be executed,
    wherein the master information includes operation job master information related to an operation job of the equipment,
    the generated information includes individual article list information related to an individual usage condition of the component,
    the integrated circuit performs
        a component extraction process of extracting the component, which is required for the operation job and to which a job is not currently allocated, based on the individual article list information,
        a priority assignment process of assigning priorities to a plurality of components extracted in the component extraction process, and
        a component selection process of excepting a predetermined quantity $m_i$ in descending order of priority from the components to which the priorities are assigned in the priority assignment process, and selecting components corresponding to a required quantity to be used in the operation job in descending order of priority from remaining components, and
    the predetermined quantity $m_i$ is treated as the initial factor in the factor setting process.

2. The operation plan preparation and evaluation device according to claim 1,
    wherein the master information includes operation job master information related to an operation job of the equipment,
    the generated information includes individual article list information related to an individual usage condition of the component,
    the integrated circuit performs
        a component extraction process of extracting the component, which is required for the operation job and is not currently used, based on the individual article list information, and
        a priority assignment process of assigning priorities to a plurality of components extracted in the component extraction process,
    the priorities are assigned to the components using a formula for computation represented by "priority=coefficient $\alpha_i \times$ residual life of component+(1−coefficient $\alpha_i$)×removing time of component removed at previous time" or a formula for computation represented by "priority=coefficient $\alpha_i \times$ priority of residual life of component+(1−coefficient $\alpha_i$)×priority when removing time of component removed at previous time is arranged in time sequence" in the priority assignment process, and
    the coefficient $\alpha_i$ ($0 \le \alpha_i \le 1$) is treated as the initial factor in the factor setting process.

3. The operation plan preparation and evaluation device according to claim 2,
    wherein the generated information includes information about an individual residual life of the component,
    an evaluation value of the operation plan is calculated using an evaluation function for evaluating the operation plan in the operation plan evaluation process, and
    the evaluation function is a function including, as a variable, at least one of a total residual life obtained by adding residual lives of all the components, a predetermined evaluation scale, a quantity of new components, and a quantity of discarded components.

4. The operation plan preparation and evaluation device according to claim 3,
    wherein the evaluation scale is a weighted average of a purity $P_i$ of a used component in a predetermined operation job i of the equipment,
    when the number of operation jobs i is set to N, a set of components allocated to the operation jobs i is set to $C_i$, and a set of components previously allocated to h operation jobs among the components allocated to the operation jobs i is set to $A_h$,
    the weighted average of the purity $P_i$ corresponds to a formula for computation represented by "weighted average of purity $P_i = \Sigma_i \{(|C_i|/N) \times P_i\}$", and
    the purity $P_i$ corresponds to a formula for computation represented by "purity $P_i = (1/|C_i|) \max |C_i \hat{} A_i|$", and
    the evaluation function is a function represented by "evaluation value=$w_1 \times$total residual life obtained by adding residual lives of all components+$w_2 \times$(1−weighted average of purities $P_i$)+$w_3 \times$quantity of new components+$w_4 \times$quantity of discarded components".

5. The operation plan preparation and evaluation device according to claim 4,
    wherein an event generation process of generating events including an operation start event in which operation of the equipment starts, and an operation end event in which the operation of the equipment is suspended,
    an operation start event process of simulating an operation of the component in the operation start event, and

19 an operation end event process of simulating an operation of the component in the operation end event are performed in the operation plan preparation process, the initial factor is a factor for selecting the component used in the operation start event, and the component is selected based on the set value set in the factor setting process in the operation start event process.

6. The operation plan preparation and evaluation device according to claim 5, wherein a test end event in which a test of the component ends, and a repair end event in which a repair of the component ends are generated in the event generation process, and a test end event process of simulating an operation of the component in the test end event, and a repair end event process of simulating an operation of the component in the repair end event are performed in the operation plan preparation process.

7. An operation plan preparation and evaluation device for preparing an operation plan for a component used in equipment and evaluating the prepared operation plan, the operation plan preparation and evaluation device comprising:

storage for storing master information related to the equipment and the component, generated information related to the equipment and the component generated when the operation plan is prepared, and an initial factor used when the operation plan is prepared; and an integrated circuit for preparing the operation plan based on the master information, the generated information, and the initial factor, wherein the integrated circuit performs a factor setting process of assigning a predetermined set value as the initial factor, an operation plan preparation process of preparing the operation plan based on the initial factor serving as the set value, the master information, and the generated information, an operation plan evaluation process of evaluating a plurality of respective operation plans prepared by repeatedly performing the operation plan preparation process while varying the set value of the initial factor in the factor setting process, and deriving an optimum operation plan, and causing the optimum operation plan for the component to be executed, wherein the master information includes operation job master information related to an operation job of the equipment, the generated information includes individual article list information related to an individual usage condition of the component, the integrated circuit performs a component extraction process of extracting the component, which is required for the operation job and is not currently used, based on the individual article list information, and a priority assignment process of assigning priorities to a plurality of components extracted in the component extraction process, the priorities are assigned to the components using a formula for computation represented by "priority=coefficient $\alpha_i$×residual life of component+ (1−coefficient $\alpha_i$)×removing time of component removed at previous time" or a formula for computation represented by "priority=coefficient $\alpha_i$×priority of residual life of component+(1−coefficient $\alpha_i$)×priority

20 when removing time of component removed at previous time is arranged in time sequence" in the priority assignment process, and the coefficient $\alpha_i$ ($0 \leq \alpha_i \leq 1$) is treated as the initial factor in the factor setting process.

8. An operation plan preparation and evaluation method of preparing an operation plan for a component used in equipment and evaluating the prepared operation plan for an operation plan preparation and evaluation device according to claim 1, the operation plan preparation and evaluation method comprising:

assigning a predetermined set value as an initial factor used when the operation plan is prepared;

preparing the operation plan based on the initial factor serving as the set value, master information related to the equipment and the component, and generated information related to the equipment and the component generated when the operation plan is prepared; and evaluating a plurality of respective operation plans prepared by repeatedly performing the preparing while varying the set value of the initial factor in the assigning, and deriving an optimum operation plan.

9. An operation plan preparation and evaluation method of preparing an operation plan for a component used in equipment and evaluating the prepared operation plan for an operation plan preparation and evaluation device according to claim 2, the operation plan preparation and evaluation method comprising:

assigning a predetermined set value as an initial factor used when the operation plan is prepared;

preparing the operation plan based on the initial factor serving as the set value, master information related to the equipment and the component, and generated information related to the equipment and the component generated when the operation plan is prepared; and evaluating a plurality of respective operation plans prepared by repeatedly performing the preparing while varying the set value of the initial factor in the assigning, and deriving an optimum operation plan.

10. An operation plan preparation and evaluation method of preparing an operation plan for a component used in equipment and evaluating the prepared operation plan for an operation plan preparation and evaluation device according to claim 3, the operation plan preparation and evaluation method comprising:

assigning a predetermined set value as an initial factor used when the operation plan is prepared;

preparing the operation plan based on the initial factor serving as the set value, master information related to the equipment and the component, and generated information related to the equipment and the component generated when the operation plan is prepared; and evaluating a plurality of respective operation plans prepared by repeatedly performing the preparing while varying the set value of the initial factor in the assigning, and deriving an optimum operation plan.

11. An operation plan preparation and evaluation method of preparing an operation plan for a component used in equipment and evaluating the prepared operation plan for an operation plan preparation and evaluation device according to claim 4, the operation plan preparation and evaluation method comprising:

assigning a predetermined set value as an initial factor used when the operation plan is prepared;

preparing the operation plan based on the initial factor serving as the set value, master information related to the equipment and the component, and generated information related to the equipment and the component generated when the operation plan is prepared; and evaluating a plurality of respective operation plans prepared by repeatedly performing the preparing while varying the set value of the initial factor in the assigning, and deriving an optimum operation plan.

12. An operation plan preparation and evaluation method of preparing an operation plan for a component used in equipment and evaluating the prepared operation plan for an operation plan preparation and evaluation device according to claim 5, the operation plan preparation and evaluation method comprising:

assigning a predetermined set value as an initial factor used when the operation plan is prepared;

preparing the operation plan based on the initial factor serving as the set value, master information related to the equipment and the component, and generated information related to the equipment and the component generated when the operation plan is prepared; and evaluating a plurality of respective operation plans prepared by repeatedly performing the preparing while varying the set value of the initial factor in the assigning, and deriving an optimum operation plan.

13. An operation plan preparation and evaluation method of preparing an operation plan for a component used in equipment and evaluating the prepared operation plan for an operation plan preparation and evaluation device according to claim 5, the operation plan preparation and evaluation method comprising:

assigning a predetermined set value as an initial factor used when the operation plan is prepared;

preparing the operation plan based on the initial factor serving as the set value, master information related to the equipment and the component, and generated information related to the equipment and the component generated when the operation plan is prepared; and evaluating a plurality of respective operation plans prepared by repeatedly performing the preparing while varying the set value of the initial factor in the assigning, and deriving an optimum operation plan.

14. An operation plan preparation and evaluation method of preparing an operation plan for a component used in equipment and evaluating the prepared operation plan for an operation plan preparation and evaluation device according to claim 6, the operation plan preparation and evaluation method comprising:

assigning a predetermined set value as an initial factor used when the operation plan is prepared;

preparing the operation plan based on the initial factor serving as the set value, master information related to the equipment and the component, and generated information related to the equipment and the component generated when the operation plan is prepared; and evaluating a plurality of respective operation plans prepared by repeatedly performing the preparing while varying the set value of the initial factor in the assigning, and deriving an optimum operation plan.

15. An operation plan preparation and evaluation method of preparing an operation plan for a component used in equipment and evaluating the prepared operation plan for an operation plan preparation and evaluation device according to claim 7, the operation plan preparation and evaluation method comprising:

assigning a predetermined set value as an initial factor used when the operation plan is prepared;

preparing the operation plan based on the initial factor serving as the set value, master information related to the equipment and the component, and generated information related to the equipment and the component generated when the operation plan is prepared; and evaluating a plurality of respective operation plans prepared by repeatedly performing the preparing while varying the set value of the initial factor in the assigning, and deriving an optimum operation plan.

* * * * *